(12) United States Patent
Riedel et al.

(10) Patent No.: US 8,985,539 B2
(45) Date of Patent: Mar. 24, 2015

(54) MOUNTING BRACKET FOR ELECTRONIC CONTROL MODULES

(71) Applicant: Caterpillar Inc., Peoria, IL (US)

(72) Inventors: Robert E. Riedel, Peoria, IL (US); Kevin Urquhart, Birtley (GB)

(73) Assignee: Caterpillar Inc., Peoria, IL (US)

(*) Notice: Subject to any disclaimer, the term of this patent is extended or adjusted under 35 U.S.C. 154(b) by 166 days.

(21) Appl. No.: 13/677,363

(22) Filed: Nov. 15, 2012

(65) Prior Publication Data

US 2014/0131536 A1    May 15, 2014

(51) Int. Cl.
  *A47F 5/00* (2006.01)
  *B60R 16/023* (2006.01)

(52) U.S. Cl.
  CPC .......... *B60R 16/0239* (2013.01); *Y10S 248/918* (2013.01)
  USPC ..................... 248/309.1; 248/205.1; 248/300; 248/918

(58) Field of Classification Search
  USPC ................... 248/300, 309.1, 918, 205.1, 317
  See application file for complete search history.

(56) References Cited

U.S. PATENT DOCUMENTS

| | | | | |
|---|---|---|---|---|
| 1,898,835 | A * | 2/1933 | Henderson | 248/311.2 |
| 4,964,525 | A * | 10/1990 | Coffey et al. | 220/3.9 |
| 5,524,860 | A * | 6/1996 | Ives | 248/674 |
| 7,053,300 | B2 * | 5/2006 | Denier et al. | 174/58 |

FOREIGN PATENT DOCUMENTS

| | | |
|---|---|---|
| CN | 201989732 | 9/2011 |
| JP | 2009120113 | 6/2009 |
| KR | 2009058092 | 12/2009 |

* cited by examiner

*Primary Examiner* — Amy J Sterling
(74) *Attorney, Agent, or Firm* — BakerHostetler (57) ABSTRACT

A modular assembly for mounting electronic control modules is disclosed. The modular assembly comprises a generally planar bracket having a main portion having a first side and a second side opposite of the first side, and at least mounting three feet extending from said main portion. At least four mounting points are located near a perimeter of each of the first and second surfaces. At least one electronic control module is attached to the mounting points on the first surface and at least one electronic control module is attached to the mounting points on the second surface.

8 Claims, 9 Drawing Sheets

MOUNTING BRACKET FOR ELECTRONIC CONTROL MODULES

TECHNICAL FIELD

The present disclosure relates to an apparatus for mounting electronic control modules to a vehicle chassis.

BACKGROUND

Vehicles are commonly equipped with electronic controllers that monitor and control the functions of engines, transmissions, operator stations, hydraulic systems, and the like. The electronic controllers must be mounted in a manner that secures them to the vehicle while also protecting them from undue shock and vibration. Mounting locations are often crowded with other vehicle components, which makes installation and removal of the electronic controllers for service difficult. In addition, the electronic controllers are often connected to thick bundles of wire harnesses that must be carefully routed around other vehicle components, further hampering servicing of the electronic controllers.

SUMMARY OF THE INVENTION

In one aspect of the present disclosure, a generally planar bracket for supporting electronic control modules is disclosed. The bracket comprises a main portion having a first surface, a second surface opposite the first surface, a first edge, a second edge oriented 90 degrees from the first edge, at least four mounting points located near a perimeter of each of the first and second surfaces, a first mounting foot portion extending from the first edge and oriented 90 degrees from the first surface toward the second surface, second and third mounting foot portions extending from the second edge and oriented 90 degrees from the first surface toward the second surface, the first, second, and third mounting foot portions having slots configured to accept fasteners, and wherein said slots are oriented along different Cartesian axes.

In another aspect of the present disclosure, a modular assembly for mounting electronic control modules is disclosed. The method comprises a generally planar bracket having a main portion having a first side and a second side opposite of the first side, at least mounting three feet extending from said main portion, at least four bosses, configured to accept a threaded fastener, located near a perimeter of each of the first and second surfaces, wherein a first electronic control module is threadably attached to said bosses on said first surface and a second electronic control module is threadably attached to said bosses on said second surface.

In yet another aspect of the present disclosure, a modular assembly for mounting electronic control modules is disclosed. The modular assembly comprises a generally planar bracket having a main portion having a first side and a second side opposite of the first side, at least mounting three feet extending from said main portion, three bosses, configured to accept a threaded fastener, located near a perimeter of each of the first and second surfaces, wherein at least one electronic control module is threadably attached to said bosses on said first surface and at least one electronic control module is threadably attached to said bosses on said second surface.

DETAILED DESCRIPTION

Figure 3:
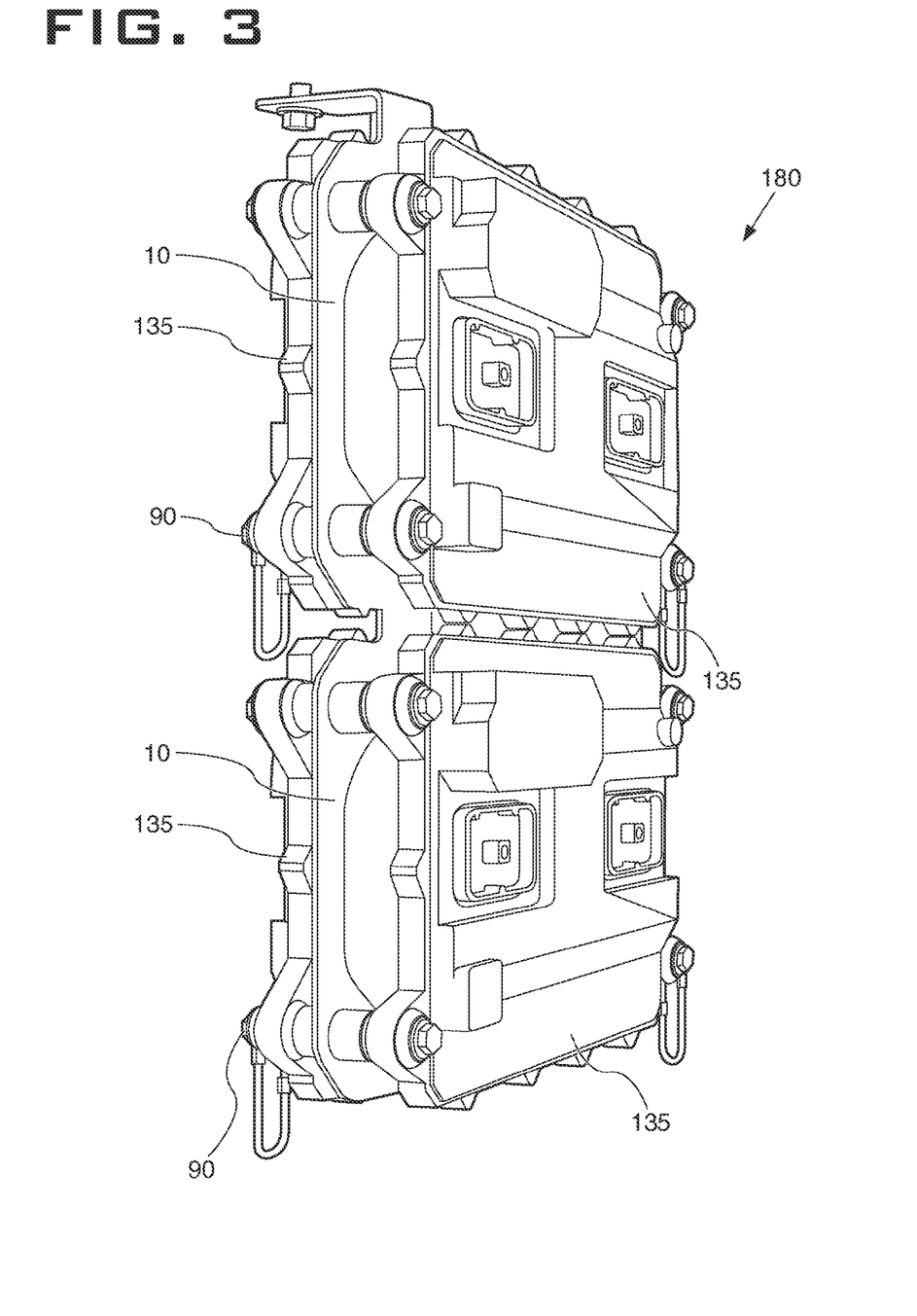
FIG. 3 is another depiction of an exemplary embodiment of a modular assembly for mounting electronic control modules
Figure 4:
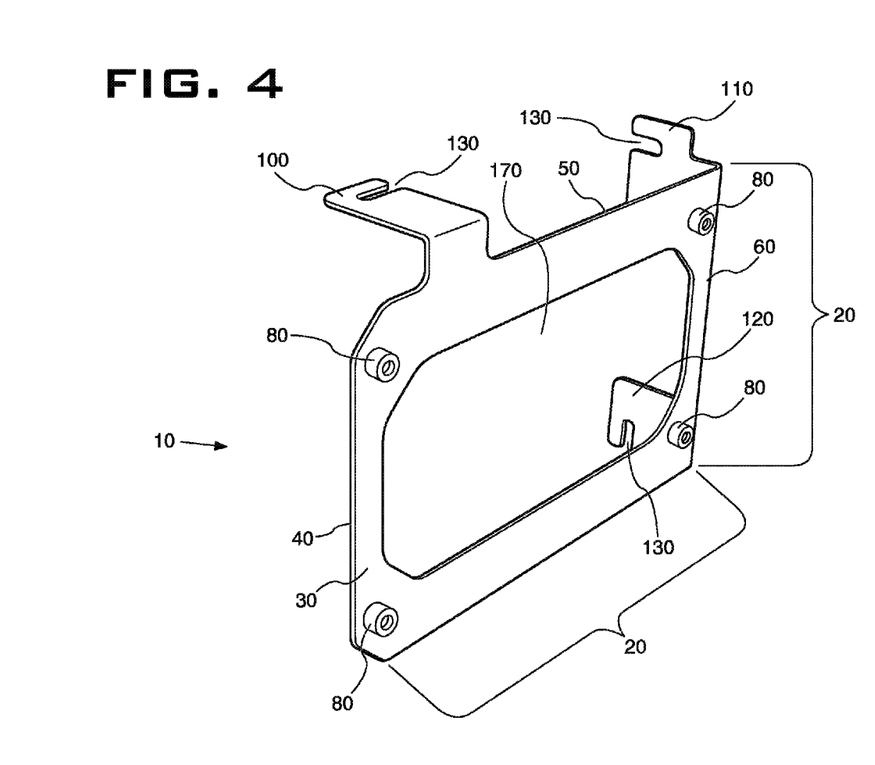
FIG. 4 is a depiction of an exemplary embodiment of a bracket configured for mounting electronic control modules
Figure 5:
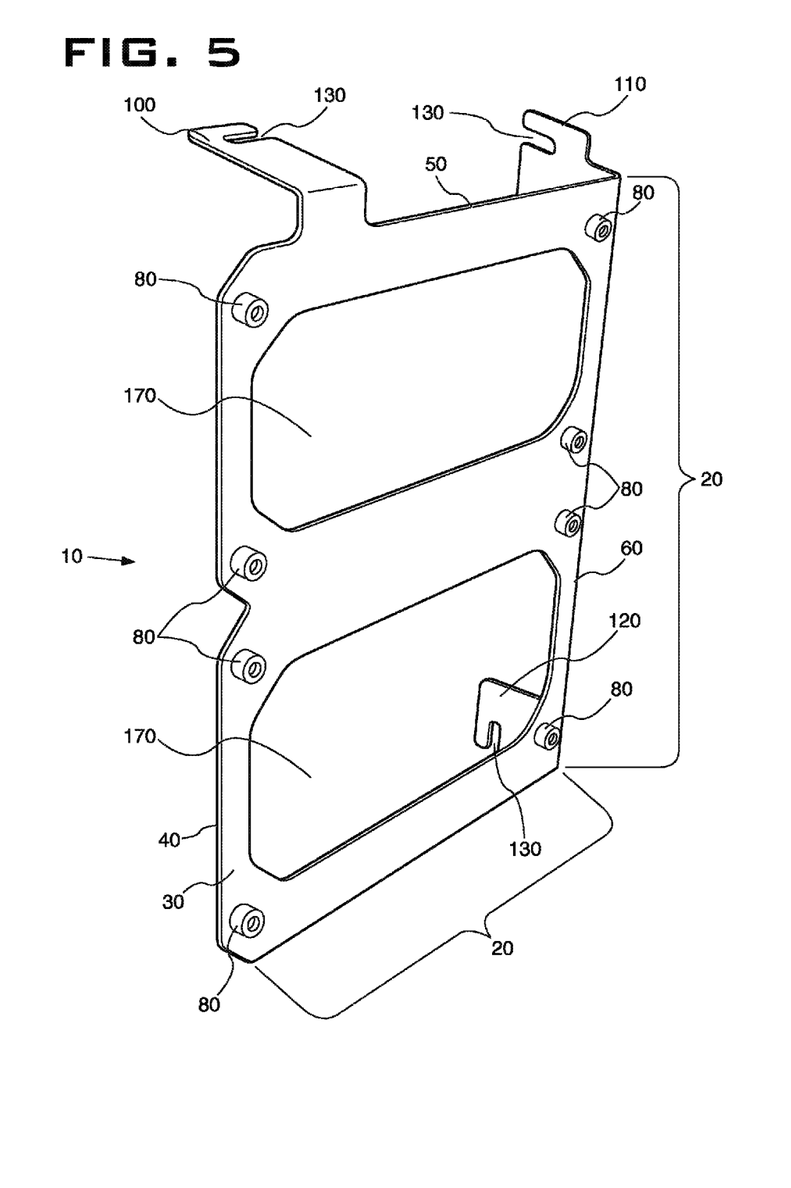
FIG. 5 is another depiction of an exemplary embodiment of a bracket configured for mounting electronic control modules

Referring to FIGS. 3, 4, and 5, a bracket 10 for mounting electronic control modules to a vehicle chassis 5 is shown. The bracket 10 is generally planar in configuration. The bracket 10 consists of a main portion 20 which may be generally square or rectangular in shape not including corner cuts, gussets, voids, or other features. The main portion 20 has a first surface 30 and a second surface 40 that is opposite of the first surface 30. The main portion has a first edge 50 and a second edge 60 that is oriented 90 degrees from the first edge 50. The main portion 20 also as a third edge 62 that is opposite and generally parallel to the first edge 50, as well as a fourth edge 64 that is opposite and generally parallel to the second edge 60.

The bracket 10 may include a void 170 near the middle of the main portion 20. The purpose of the void 170 is to reduce the mass of the bracket 10. Reduction of mass is important for a number of reasons. One reason is reduction of overall vehicle mass. A second reason is for reduction of the mass of the ECM mounting assembly 180. A reduction of mass results in a reduction of the amplitude of oscillation of the ECM mounting assembly 180 due to shock and vibration. The void 170 may be relatively small, occupying approximately 25% of the surface area of the main portion 20. The void 170 may be 75% or larger if mass must be reduced further. The size of the void 170 can be chosen to be as large as possible to achieve a target mass savings. The chosen size of the void depends on the bracket material thickness and the overall stiffness that is required.

Bracket 10 includes at least three mounting feet extending from the main portion 20. FIGS. 3, 4, and 5 show a first mounting foot 100 extending from the first edge 50, while the second and third mounting feet (110, 120) extend from the second edge. The mounting feet 100, 110, and 120 are shown in FIG. 3 oriented from away from the first surface 30 toward the second surface 40 at an angle of 90 degrees. In this way, the main portion 20 and mounting feet 100, 110, and 120 can be made from the same piece of material, such as sheet metal. The choice of reference to the first surface 30 and second surface 40 is of course arbitrary and could be reversed.

The mounting feet 100, 110, and 120 include slots 130 for accepting fasteners 90. The slots may be open ended and can be oriented in order to aid mounting of the bracket to the vehicle chassis 5. For instance, FIG. 3 shows slots 130 that are oriented along different axes of the Cartesian coordinate system (x, y, z). Note that mounting feet located on the same edge may also have slots 130 oriented in the same direction.

The slots 130 are configured to accept an appropriately sized threaded fastener 90. The slots 130 allow installation of the bracket 10 onto fasteners that have been partially threaded into a mounting surface. For instance, a fastener 90 may be partially threaded into a vehicle frame as a first step. Slot 130 in the third mounting foot 120 can be moved onto the partially-threaded fastener 90, partially supporting the mass of the ECM mounting assembly 180. Next the ECM mounting assembly 180 can be rotated into position allowing the remaining fasteners 90 to be located in the slots 130 in the first mounting foot 100 and the second mounting foot 110. The remaining fasteners 90 can be threaded and torqued.

Bracket 10 is designed to mount at least one electronic control module (ECM) 135 on the first surface 30 and at least one ECM 135 on a second surface 40. The bracket 10 can also mount one ECM 135 on the first surface 30 or one ECM 135 on the second surface 40. Alternatively, the bracket 10 could mount two ECMs 135 on the first surface 30 and one ECM 135 on the second surface 40 or any combination thereof. Mounting points 70 are provided on the main portion 20 for this purpose. Mounting points 70 are located around the perimeter of the first surface 30 and second surface 40 of main portion 20. For example, the mounting points 70 may be located near the corners of the main portion 20. At least three mounting points may be provided on each surface in order to prevent any long unsupported spans, thereby reducing high amplitude oscillations in ECMs 135 that arise from shock or vibration.

One method of mounting ECMs 140, 150 to bracket 10 is by means of a through-hole designed to accept the shaft of a threaded fastener 90. Using this mounting method, a threaded fastener 90 would be inserted through a first ECM 140, then through the bracket 10, and finally through a second ECM 150. A hex nut could then be used to retain the second ECM 150. The bolted joint could be completed by the use of spacers and washers 92 as is known in the art. The joint could also include isolation washers 160 made of a vibration absorbing material to prevent certain frequencies and amplitudes of shock and vibration from reaching the ECMs 140, 150.

Another method of mounting ECMs 140, 150 to bracket 10 is by means of a boss 80. The boss 80 is generally cylindrical in shape with a hole in the axial center for accepting a fastener. The hole in the boss 80 may be threaded to accept a fastener 90. The hole could also be configured to accept a press-fit fastener. The boss is then welded or otherwise attached to the bracket 10 where mounting points 70 are located. Using this mounting method, a threaded fastener 90 would be inserted through a first ECM 140 and then threaded into the boss 80. The bolted joint could be completed by the use of spacers and washers 92 as is known in the art. The joint could also include isolation washers 160 made of a vibration absorbing material to prevent certain frequencies and amplitudes of shock and vibration from reaching the ECMs 140, 150.

Figure 1:
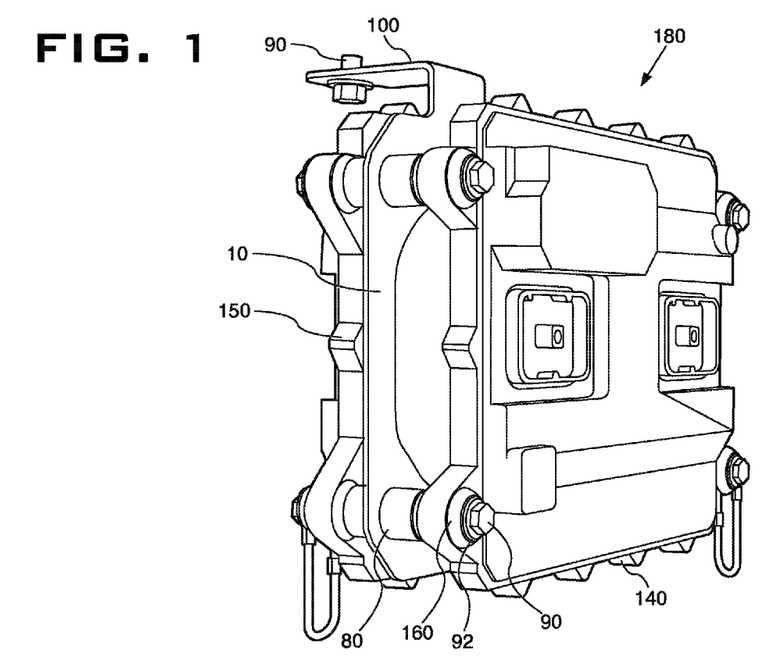
FIG. 1 is a depiction of an exemplary embodiment of a modular assembly for mounting electronic control modules

It should be noted that the mounting bracket 10 as described above lends itself to a number of ECM mounting options. For instance, the bracket 10 could be installed with one ECM on either of the first surface 30 or the second surface 40. Referring to FIG. 1, the same bracket 10 could be installed with a first ECM 140 on the first surface 30 and a second ECM 150 on the second surface 40.

Figure 2:
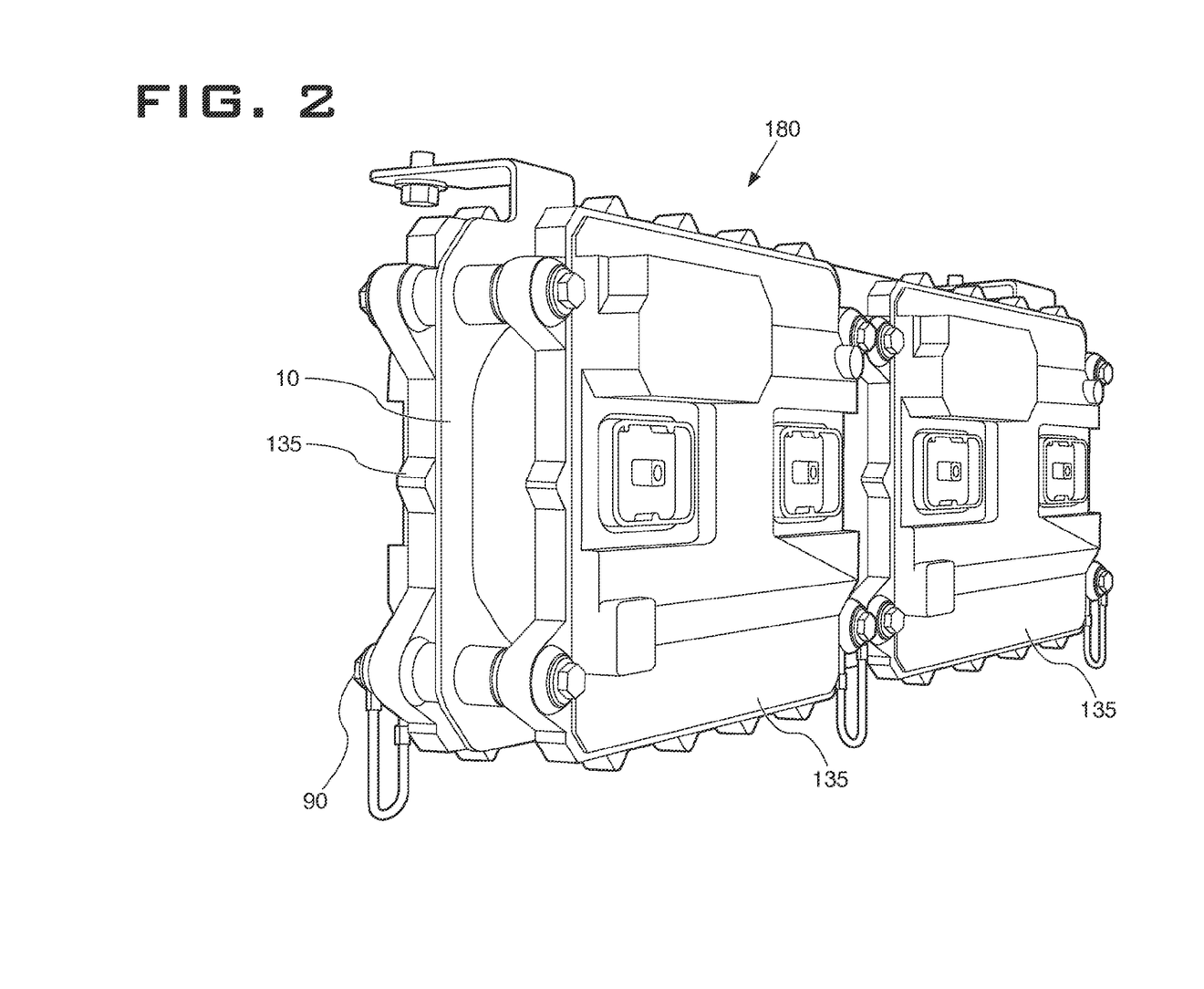
FIG. 2 is another depiction of an exemplary embodiment of a modular assembly for mounting electronic control modules

Additionally, the bracket 10 could be configured to be installed with one ECM on either the first surface 30 or the second surface 40, and two ECMs on the opposite surface. Referring to FIG. 2, the bracket 10 could also be configured to be installed with two ECMs on the first surface 30 and two ECMs on the second surface 40.

Figure 6:
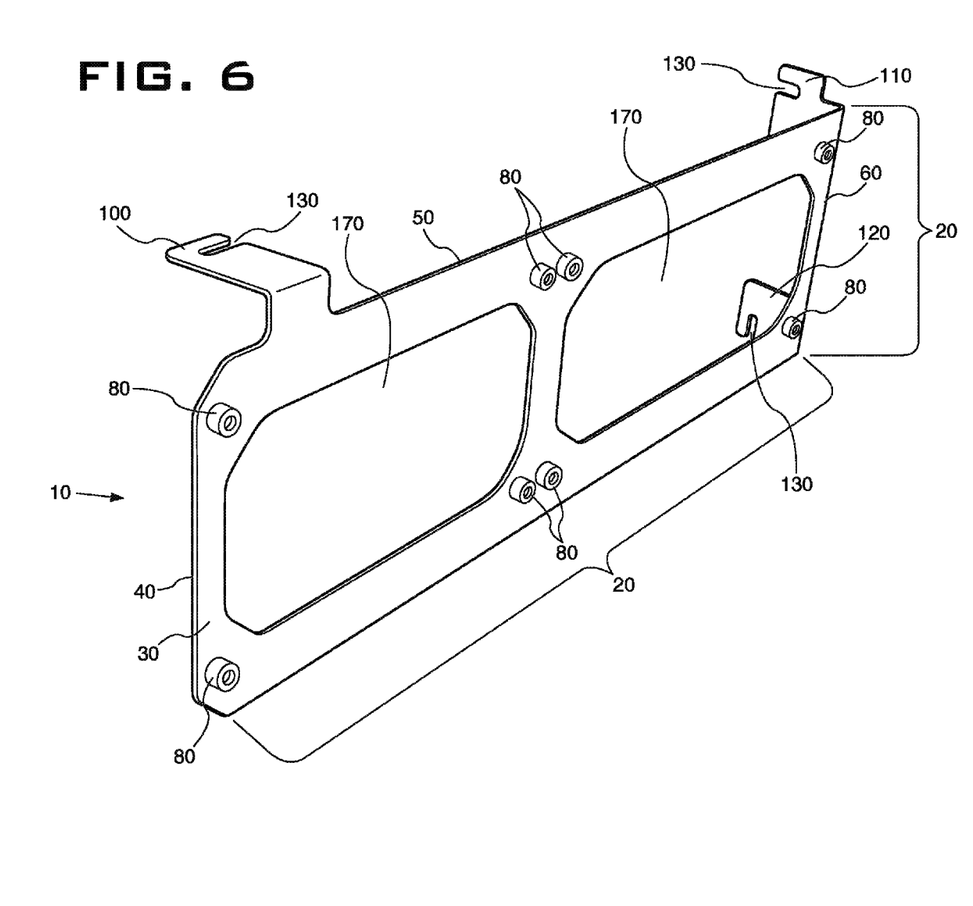
FIG. 6 is another depiction of an exemplary embodiment of a bracket configured for mounting electronic control modules

The bracket 10 and ECMs 140, 150 are assembled together to form an ECM mounting assembly 180 shown in FIGS. 1 and 2. This assembly simplifies and eases mounting of the ECMs 140, 150 into the available space on the vehicle chassis 5. For instance, the chassis may have various wire harness bundles, conduits, pumps, motors, or other components mounted in the same area that is required to mount the ECMs 140, 150. As seen in FIG. 6, there may not be enough room on the chassis for mounting two separate conventional ECM assemblies. The back-to-back mounting of ECMs 140, 150 requires less mounting area on the vehicle chassis 5 than is required of two separate conventional assemblies.

Figure 7:
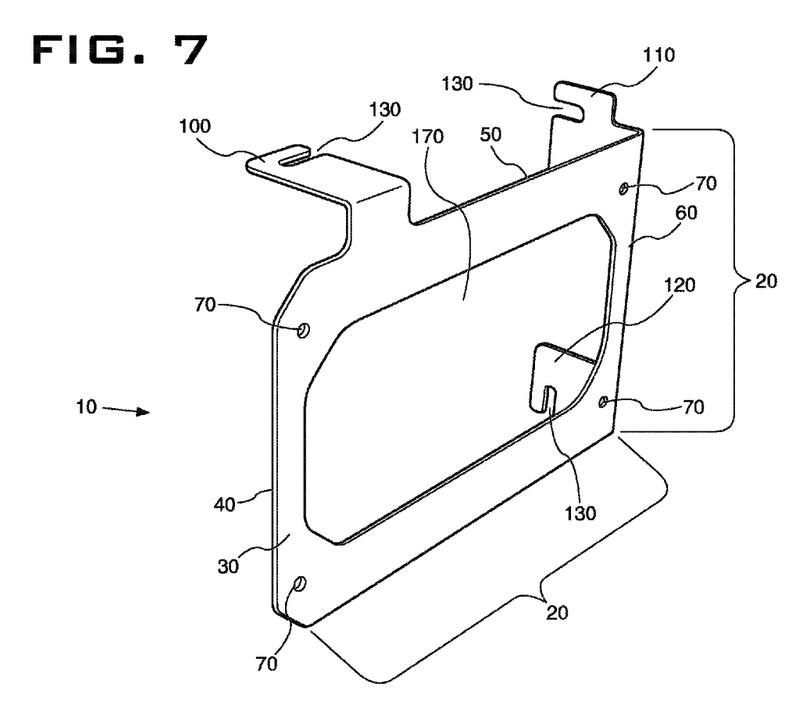
FIG. 7 is yet another depiction of an exemplary embodiment of a bracket configured for mounting electronic control modules
Figure 8:
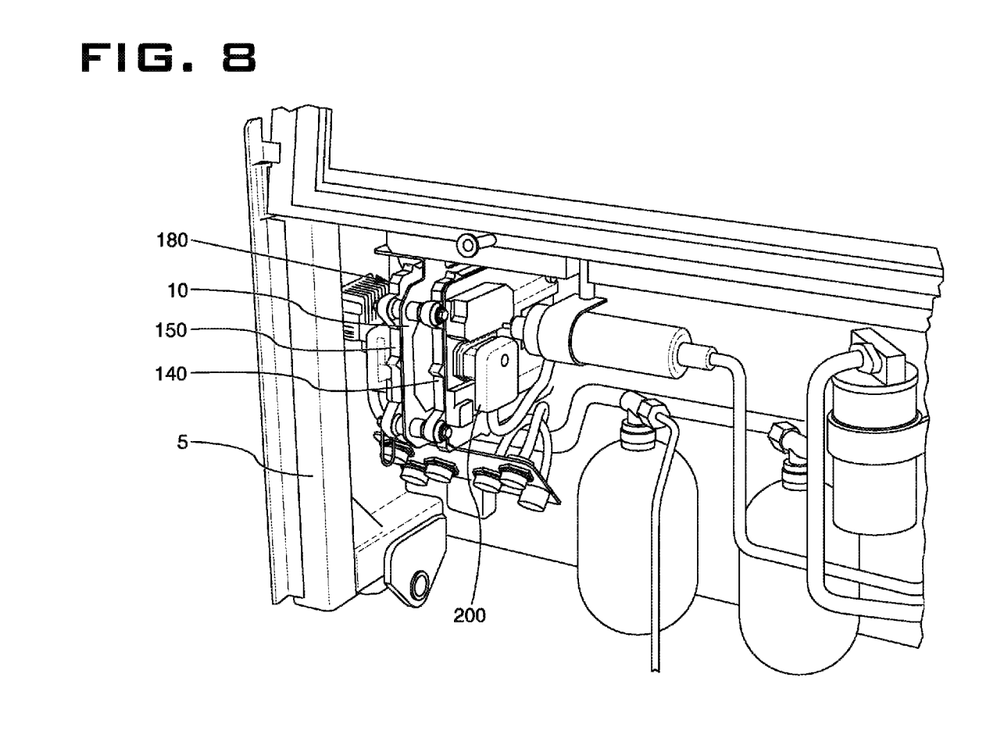
FIG. 8 is a depiction of an exemplary embodiment of a modular assembly of electronic control modules
Figure 9:
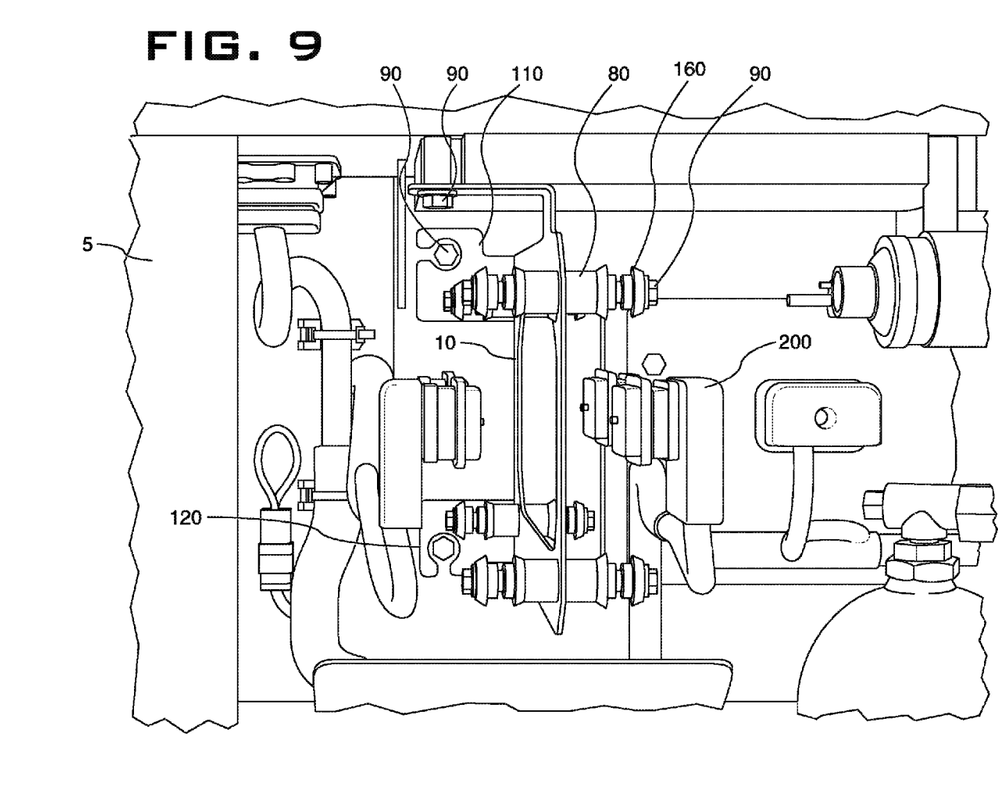
FIG. 9 is a depiction of an exemplary embodiment of a modular assembly of electronic control modules with some elements removed for clarity

Further, there may not be enough room to access the fasteners 90 for the mounting bracket 10 in order to install or remove a conventional ECM mounting assembly. FIG. 7 shows the installed positions of fasteners 90. Note that the ECMs 140, 150 are not shown in the interest of clarity.

Additionally, ECMs 140, 150 are typically connected to a bulky wire harness 190. The wire harness 190 is electrically connected and mechanically attached to ECMs 140, 150 by a wire harness connector 200. The wire harness connector 200 is typically affixed to ECMs 140, 150 via at least one fastener or clip. Access to the fastener or clip is typically difficult given the proximity of the other vehicle components that are present in the same space.

INDUSTRIAL APPLICABILITY

Vehicles of all types are commonly equipped with electronic control modules that control various vehicle components and systems. As vehicle features and capabilities expand, more components and systems are added to the vehicle. As such, mounting space on a vehicle is increasingly at a premium.

The proposed ECM mounting assembly 180 is intended to be mounted on a vehicle chassis 5 along at least two planes aligned along different Cartesian axes. This mounting method avoids a single-plane cantilever mount which can lead to excess amplitude from shock and vibration.

However, the two plane mounting method creates challenges when trying to support the ECM mounting assembly 180 while inserting threaded fasteners 90.

The proposed ECM mounting assembly 180 is intended to ease installation and removal of ECMs 140, 150 as well as allow installation of ECMs 140, 150 into a space that is too small to accommodate two separate conventional ECM assemblies. The slots 130 located in mounting feet 100, 110, 120 can be inserted over a partially inserted fastener 90 in order to hold the mass of the ECM mounting assembly 180 while the other fasteners 90 are inserted. For example, the slot 130 on mounting foot 120 is configured to allow the slot 130 to be inserted over a fastener 90 that is partially threaded into a vehicle chassis 5 thereby at least partially supporting the mass of the ECM mounting assembly 180. The fastener 90 will also help support the ECM mounting assembly 180 against the tension of the attached wire harness 190. The ECM mounting assembly 180 is then rotated such that the slot 130 in mounting foot 110 is inserted over another partially threaded fastener 90. Another fastener 90 can then be inserted through the slot 130 in the remaining mounting foot 100 and all the fasteners 90 can be properly torqued. It should be noted that the fasteners 90 can be installed in any order that is convenient. It should also be noted that the directions of the slots can be varied in the design of bracket 10 as needed in order to clear various vehicle components for installation or removal.

The ECM mounting assembly 180 in the present disclosure also allows the wire harness connectors 200 to be attached to the ECMs 140, 150 before the ECM mounting assembly 180 is mounted to the vehicle chassis 5. This greatly simplifies attachment of the wire harness connectors 200.

What is claimed is:

1. A modular assembly comprising:
a generally planar bracket having
a main portion having a first surface and a second surface opposite of the first surface;
at least three mounting feet extending from said main portion;
at least four bosses, configured to accept a threaded fastener, located near a perimeter of each of the first and second surfaces; and
a first electronic control module threadably attached to said bosses on said first surface and a second electronic control module threadably attached to said bosses on said second surface, wherein said mounting feet have slots configured to accept fasteners, and said slots are oriented along different Cartesian axes.

2. The modular assembly of claim 1 wherein said mounting feet are oriented 90 degrees from the first surface toward the second surface.

3. The modular assembly of claim 1 wherein the main portion includes a central void that accounts for at least 25% of the surface area of said main portion.

4. A modular assembly comprising:
a generally planar bracket having
a main portion having a first surface and a second surface opposite of the first surface;
three mounting feet extending from said main portion;
three bosses, configured to accept a threaded fastener, located near a perimeter of each of the first and second surfaces; and
a first electronic control module threadably attached to said bosses on said first surface and a second electronic control module threadably attached to said bosses on said second surface, wherein said mounting feet have slots configured to accept fasteners, and said slots are oriented along different Cartesian axes.

5. The modular assembly of claim 4 wherein said mounting feet are oriented 90 degrees from the first surface toward the second surface.

6. The modular assembly of claim 4 wherein the main portion includes a central void that accounts for at least 25% of the surface area of said main portion.

7. The modular assembly of claim 4, wherein the first and second electronic control modules are vehicle electronic control modules.

8. The modular assembly of claim 1, wherein the first and second electronic control modules are vehicle electronic control modules.

* * * * *